(12) United States Patent
Krasovskiy et al.

(10) Patent No.: US 12,269,906 B2
(45) Date of Patent: Apr. 8, 2025

(54) ETHYLENE-BASED POLYMER COMPOSITION WITH BRANCHING

(71) Applicant: Dow Global Technologies LLC, Midland, MI (US)

(72) Inventors: Arkady L. Krasovskiy, Lake Jackson, TX (US); Yifan Y. Dong, Lake Jackson, TX (US); Alexandra E. Frankel, Lake Jackson, TX (US); Ivan A. Konstantinov, Manvel, TX (US); Sarat Munjal, Lake Jackson, TX (US); Sean W. Ewart, Pearland, TX (US); Rajesh P. Paradkar, Lake Jackson, TX (US); Daniel W. Baugh, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 583 days.

(21) Appl. No.: 17/631,033

(22) PCT Filed: Jul. 27, 2020

(86) PCT No.: PCT/US2020/043699
§ 371 (c)(1),
(2) Date: Jan. 28, 2022

(87) PCT Pub. No.: WO2021/021709
PCT Pub. Date: Feb. 4, 2021

(65) Prior Publication Data
US 2022/0259341 A1    Aug. 18, 2022

Related U.S. Application Data

(60) Provisional application No. 62/881,118, filed on Jul. 31, 2019.

(51) Int. Cl.
C08F 210/02        (2006.01)
C08F 220/10        (2006.01)
(Continued)

(52) U.S. Cl.
CPC .......... *C08F 210/02* (2013.01); *C08F 222/28* (2013.01); *C08F 220/10* (2013.01); *C08F 220/12* (2013.01)

(58) Field of Classification Search
None
See application file for complete search history.

(56) References Cited

U.S. PATENT DOCUMENTS 2,609,355 A    9/1952   Winkler
2,626,945 A    1/1953   Carlin
(Continued)

FOREIGN PATENT DOCUMENTS

CA    1256238 A      6/1989
EP    0113904 A2  *  7/1984
(Continued)

*Primary Examiner* — Satya B Sastri
(74) *Attorney, Agent, or Firm* — Boyle Fredrickson, S.C.

(57) ABSTRACT

The present disclosure provides an ethylene-based polymer. The ethylene-based polymer is formed from reacting, under polymerization conditions, ethylene monomer and bisallyl maleate ("BAIIM"). The present ethylene-based polymer with ethylene monomer and bisallyl maleate branching agent is interchangeably referred to as "BAIIM-PE."

19 Claims, 3 Drawing Sheets

(51) Int. Cl.
*C08F 220/12* (2006.01)
*C08F 222/28* (2006.01)

(56) References Cited

U.S. PATENT DOCUMENTS

| | | |
|---|---|---|
| 3,151,183 A | 9/1964 | Bill et al. |
| 3,316,329 A | 4/1967 | Waples, Jr. |
| 3,393,168 A | 7/1968 | Johnson |
| 4,489,192 A | 12/1984 | Shih et al. |
| 4,520,183 A | 5/1985 | Subramanian |
| 4,652,607 A | 3/1987 | Stix et al. |
| 7,741,415 B2 | 6/2010 | Conrad et al. |
| 7,820,776 B2 | 10/2010 | Neuteboom et al. |
| 9,120,880 B2 | 9/2015 | Zschoch et al. |
| 9,228,036 B2 | 1/2016 | Berbee et al. |
| 9,683,058 B2 | 6/2017 | Berbee et al. |
| 10,301,403 B2 | 5/2019 | Berbee et al. |
| 2008/0242809 A1 | 10/2008 | Neuteboom et al. |
| 2009/0234082 A1 | 9/2009 | Neilen et al. |
| 2014/0288257 A1 | 9/2014 | Zschoch et al. |
| 2014/0329961 A1 | 11/2014 | Sengupta et al. |

FOREIGN PATENT DOCUMENTS

| | | | |
|---|---|---|---|
| GB | 1193721 A | * 6/1970 | ............ C08F 255/00 |
| JP | S55-743 A | 1/1980 | |
| JP | S58-125775 A | 7/1983 | |
| JP | H02-75644 A | 3/1990 | |
| SU | 729218 A1 | 4/1980 | |
| WO | 2002/057354 A2 | 7/2002 | |
| WO | 2006/101932 A2 | 3/2006 | |
| WO | 2006/101926 A2 | 9/2006 | |
| WO | 2006/102154 A2 | 9/2006 | |
| WO | 2013/095862 A1 | 6/2013 | |
| WO | 2019/133368 A1 | 7/2019 | |
| WO | 2019/133378 A1 | 7/2019 | |

* cited by examiner

ETHYLENE-BASED POLYMER COMPOSITION WITH BRANCHING

BACKGROUND

The level of branching in an ethylene-based polymer, such as low density polyethylene (LDPE) for example, is due predominantly to the reactor design (autoclave or tubular) and the polymerization conditions used to make the LDPE. Known are branching agents for increasing the level of branching in an LDPE. However, the process conditions required to achieve a modified LDPE with a high level of branching, often result in a final product with a lower crystallinity, and with a higher content of a low molecular weight extractable fraction.

Thus, the art recognizes the on-going need for LDPE with increased melt strength vis-à-vis increased branching levels, the LDPE prepared under polymerization conditions that maintain good polymer properties.

SUMMARY

The present disclosure provides an ethylene-based polymer. The ethylene-based polymer is formed from reacting (under polymerization conditions) ethylene monomer and bisallyl maleate ("BAIIM"). The present ethylene-based polymer with ethylene monomer and bisallyl maleate branching agent is interchangeably referred to as "BAIIM-PE."

The present disclosure also provides a process of producing the present ethylene-based polymer composition. The process includes polymerizing ethylene monomer in the presence of bisallyl maleate under polymerization conditions and forming an ethylene-based polymer (BAIIM-PE).

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "ethylene/alpha-olefin copolymer," as used herein, refers to a copolymer that has more than 50 mole percent polymerized ethylene monomer (based on the total amount of polymerizable monomers), and at least one alpha-olefin.

The term "ethylene-based polymer composition," as used herein, refers to a composition that includes, in polymerized form, more than 50 wt %, or a majority amount, of ethylene, based on the weight of the polymer, and, optionally, may comprise at least one comonomer or other molecule.

The term "ethylene monomer," as used herein, refers to a chemical unit having two carbon atoms with a double bond therebetween, and each carbon bonded to two hydrogen atoms, wherein the chemical unit polymerizes with other such chemical units to form an ethylene-based polymer composition.

The term "high density polyethylene," (or HDPE) as used herein, refers to an ethylene-based polymer having a density of at least 0.94 g/cc, or from at least 0.94 g/cc to 0.98 g/cc. The HDPE has a melt index from 0.1 g/10 min to 25 g/10 min. The HDPE can include ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors. The ethylene/$C_3$-$C_{20}$ α-olefin comonomer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form.

The term "low density polyethylene," (or LDPE) as used herein, refers to a polyethylene having a density from 0.910 g/cc to less than 0.940 g/cc, or from 0.918 g/cc to 0.930 g/cc, and long chain branches with a broad molecular weight distribution (MWD)—i.e., "broad MWD" from 4.0 to 20.0.

The term "polymer" or a "polymeric material," as used herein, refers to a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Density is measured in accordance with ASTM D792, Method B. Results are reported in grams per cubic centimeter (g/cc).

Infrared Spectroscopy (IR). A calibration for the IR5 detector rationing was performed using at least ten ethylene-based polymer standards (polyethylene homopolymer and ethylene/octene copolymers) of known short chain branching (SCB) frequency (measured by the $^{13}$C NMR Method), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALLS. Each standard had a molecular weight distribution (Mw/Mn) from 2.0 to 2.5, as determined by GPC. Example polymer properties for the Copolymer standards are shown in Table A.

TABLE A

"Copolymer" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "IR5$_{Methyl\ Channel\ Area}$/IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "Copolymer" standards. A linear fit of the Wt % Comonomer frequency versus the "IR5 Area Ratio" was constructed in the form of the following Equation 1:

$$\text{Wt \% Comonomer} = A_{0+}[A_1 \times (IR5_{Methyl\ Channel\ Area}/IR5_{Measurement\ Channel\ Area})] \quad \text{(Eqn. 1)}$$

End-Group Correction of the wt % Comonomer data can be made via knowledge of the termination mechanism if there is significant spectral overlap with the comonomer termination (methyls) via the molecular weight determined at each chromatographic slice.

Melt Index

The term, "melt index," as used herein, refers to the measure of how easily a thermoplastic polymer flows when in a melted state. Melt index, or $I_2$, is measured in accordance by ASTM D1238, Condition 190° C./2.16 kg, and is reported in grams eluted per 10 minutes (g/10 min). The 110 is measured in accordance with ASTM D1238, Condition 190° C./10 kg, and is reported in grams eluted per 10 minutes (g/10 min). Melt index ratio ($I_{10}/I_2$) is measured in accordance with ASTM D1238 at a temperature of 190° C. taking the ratio of values obtained at 10 kg and 2.16 kg.

Melt Strength

The term "melt strength," as used herein, refers to the measure of the maximum tension applied to a polymer in a melted state, before the polymer breaks. Melt strength is measured at 190° C. using a Göettfert Rheotens 71.97 (Göettfert Inc.; Rock Hill, SC). The melted sample (from 25 to 50 grams) is fed with a Göettfert Rheotester 2000 capillary rheometer, equipped with a flat entrance angle (180 degrees), and of length of 30 mm and diameter of 2 mm. The sample is fed into the barrel (L=300 mm, Diameter=12 mm), compressed, and allowed to melt for 10 minutes, before being extruded at a constant piston speed of 0.265 mm/s, which corresponds to a wall shear rate of 38.2 s$^{-1}$ at the given die diameter. The extrudate passes through the wheels of the Rheotens, located at 100 mm below the die exit, and is pulled by the wheels downward, at an acceleration rate of 2.4 millimeters per square second (mm/s$^2$). The force (measured in centiNewtons, cN) exerted on the wheels is recorded as a function of the velocity of the wheels (in mm/s). Samples are repeated at least twice, until two curves of the force (in cN) as a function of strand velocity (in mm/s) superimpose, then the curve that had the highest velocity at the strand break is reported. Melt strength is reported as the plateau force before the strand breaks, in units of centinewtons, cN.

Nuclear Magnetic Resonance ($^1$H NMR)

The term "nuclear magnetic resonance," or "NMR" as used herein, refers to a spectral analysis of a material or compound that provides information regarding the chemical composition and structure of the material or compound. Samples for proton NMR were prepared using 0.1-0.2 g sample in 3.25 g of 30/70 wt/wt o-dichlorobenzene-d4/perchloroethylene (ODCB-d4/PCE) containing 0.001 M Chromium(III) acetylacetonate, Cr(AcAc)$_3$, prepared in a 10 mm tube. The samples were heated and vortexed at 115° C. to ensure homogeneity. Single pulse proton spectra were acquired on a Bruker AVANCE 600 MHz spectrometer equipped with a Bruker high-temperature CryoProbe and a sample temperature of 120° C. Spectra were acquired with ZG pulse P1=20 us (90° PW), 64 scans, AQ 1.82 s, D$_1$ 15 s.

Gas Chromatography Analysis

The term "gas chromatography analysis," as used herein, refers to a method of separating components of a chemical mixture by weight.

Water Extraction and Preparation for Headspace—Solid Phase Microextraction (HS-SPME)

Sample Films Are Prepared. Two grams (about 1 in by 1 in) of each sample (approx. 1.3 mil polymer coated onto release liner and removed to serve as a free standing film) were sample were weighed into individual "20 mL" headspace vials, and the vials were sealed. Vials with films were equilibrated at 75° C. for 10 minutes, and the headspace was extracted by SPME for analysis by gas chromatography with a quadrupole mass spectrometer (GC/qMS).

Preparation for HS-SPME

Ten grams of each film (approximately 1 in×1 in) were weighed into "40 mL" glass bottles (I-Chem, high purity). The vials were completely filled with high purity water (ASTM Type I, Reagent grade, Mill-Q Integral 3, 18.2 MΩ, <5 ppb TOC). The vials were sealed with PTFE lined caps and the film was extracted for 48 h at 40° C. After 48 hours, the bottles were removed from the oven and the contents were allowed to return to room temperature (approximately 4 h). HS-SPME analysis was performed using 20 mL headspace vials. Each vial was prepared with "3.5 g" of sodium sulfate (Sigma-Aldrich, ACS Reagent grade, purified by heating in a furnace at 1050° F. for 12 hours) and 10 grams of water extract (no film). The mixture was vigorously mixed and sonicated for 15 min to dissolve the sodium sulfate. The vials were then equilibrated at 75° C. for 10 min, and the headspace was extracted by SPME for analysis by gas chromatography with a quadrupole mass spectrometer (GC/qMS).

GC/ODP/qMS Analysis Conditions

The headspace in each vial was sampled by SPME and analyzed by GC/qMS. Quantitation was performed using an external standard calibration procedure. Automated sample analysis was performed using a Gerstel Multipurpose Sampler (MPS), an Agilent 7890A gas chromatography, and an Agilent 5975C inert XL quadrupole mass spectrometer. The MPS was controlled using Gerstel's Maestro software. Control and data collection of the GC/qMS was performed using Agilent's Chemstation software. The headspace of the water extracts was sampled using a "2 cm×50/30 μm" di-alkene benzene/carboxen/polydimethylsiloxane (Supleco) SPME fiber with equilibrated of the water at 75° C., with agitation for 10 minutes. The components on the SPME fiber were desorbed in split/splitless inlet at 250° C., followed by separation using an Agilent, VF-WAXms, "30 m×250 μm×0.5 μm" capillary column, with an oven temperature program of 50° C. (2 minute hold) to 260° C. (6 minute hold), at 15° C./min, and an initial column flow of 2.0 mL/min of helium.

Samples were then comparatively ranked on a scale of 1-5 (with 1 indicating the least and 5 indicating the most) of the detected oxygenated species (OS) or the total volatile organic compounds (VOC) in the material.

GPC Method: Triple Detector Gel Permeation Chromatography (TDGPC) for PE

A Triple Detector Gel Permeation Chromatography (3D-GPC or TDGPC) system consisting of a Polymer Laboratories (now Agilent) high temperature chromatograph Model 220, equipped with a 2-angle laser light scattering (LS) detector Model 2040 (Precision Detectors, now Agilent), an 1R-5 infra-red detector from Polymer Char (Valencia, Spain), and a 4-capillary solution viscometer (DP) (Visotek, now Malvern) is used. Data collection is performed using Polymer Char DM 100 data acquisition box and related software (Valencia, Spain). The system is also equipped with an online solvent degassing device from Polymer Laboratories (now Agilent). High temperature GPC columns consisting of four 30 cm, 20 um mixed A LS columns from Polymer Laboratories (now Agilent) are used. The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1.0 ml/minute. Column calibration and sample molecular weight calculations are performed using Polymer Char "GPC One" software. Calibration of the GPC columns is performed with 21 narrow molecular weight distribution polystyrene standards. The molecular weights of the polystyrene standards range from 580 to 8,400,000 g/mol and are arranged in 6 "cocktail" mixtures with at least a decade of separation between the individual molecular weights. The peak molecular weights of polystyrene standards are converted to polyethylene molecular weights using the following equation (as described in Williams and Ward, J. Polym. Sci., Polym. Let., 6, 621 (1968)): $M_{polyethylene}=A (M_{polystyrene})_B$ Here, B has a value of 1.0, and the experimentally determined value of A is around 0.38 to 0.44. The column calibration curve is obtained by fitting a first order polynomial to the respective polyethylene-equivalent calibration points obtained from the above Equation to the observed elution volumes. The conventional number and weight-average molecular weights (Mn(conv) and Mw(conv), respectively) are calculated according to the following equations:

$$\overline{Mn} = \frac{\sum_i Wf_i}{\sum_i (Wf_i/M_i)} \quad \overline{Mw} = \frac{\sum_i (Wf_i * M_i)}{\sum_i Wf_i}$$

where, $Wf_i$ is the weight fraction of the i-th component and $M_i$ is the molecular weight of the i-th component. The molecular weight distribution (MWD) is expressed as the ratio of the weight average molecular weight (Mw) to the number average molecular weight (Mn). The A value is determined by adjusting the A value in the Williams and Ward Equation until Mw, the weight average molecular weight, calculated using the above Equation, and the corresponding retention volume polynomial agreed with the independently determined value of Mw, obtained in accordance with a linear polyethylene homopolymer reference with known absolute weight-average molecular weight of 115,000 g/mol as measured by LALLS in a manner traceable to standard homopolymer polyethylene NBS1475. The absolute weight average molecular weight (Mw(abs)) are characterized by the LS detector and IR-4 concentration detector using the following equation:

$$Mw(\text{abs}) = K_{LS} * \frac{\Sigma(LS_i)}{\Sigma(IR_i)}$$

wherein $\Sigma(LS_i)$ is the response area of the LS detector, $\Sigma(IR_i)$ is the response area of the IR-4 detector, and $K_{LS}$ is the instrument constant which was determined using a standard NIST 1475 with known concentration and certificated value for the weight average molecular weight of 52,000 g/mol. The absolute molecular weight at each elution volume is calculated using the following equation:

$$M_{LS,i} = K_{LS} * \frac{LS_i}{IR_i}$$

wherein $K_{LS}$ is the determined instrument constant, $LS_i$ and $IR_i$ are the LS and IR detector responses of the same i-th elution component. The absolute number average and zeta average molecular weight are calculated with the following equations:

$$Mn(\text{abs}) = K_{LS} \frac{\sum(IR_i)}{\sum(IR_i)/\left(\frac{LS_i}{IR_i}\right)}$$

$$Mz(\text{abs}) = K_{LS} \frac{\sum IR_i * \left(\frac{LS_i}{IR_i}\right)^2}{\sum IR_i * \left(\frac{LS_i}{IR_i}\right)}$$

A linear extrapolation was performed on log $M_{LS,i}$-elution volume plot when the log $M_{LS,i}$ data scattered caused by low LS or IR detector responses. The results of gas chromatography are reported as a spectrum of peaks, with each peak representing an individual component of the polymer or polymer composition. GPC for poly(butadiene) was conducted analogously, with the following modifications:

Column: Agilent PLgel 5 μm particle size column (4 columns in 1 set, pore size of 50, 100, 1000, 10000 Å);
Column temperature: 40° C.;
Eluent: Tetrahydrofuran (THF), unstabilized;
Flow rate: 1.0 mL/min;
Injection volume: 100 μL;
Analysis time: 45 min;
Sample concentration: 2.5 mg/mL;
Detector: Viscoteck TDA 305 using Refractive Index Detector;
Detector temperature: 40° C.;
Calibration: Agilent Technologies Polystyrene (PS) Easi-Cal PS-2, batch number 0006252842; and
Software: OmniSEC 4.7.0.

DETAILED DESCRIPTION

1. Polymer

The present disclosure provides an ethylene-based polymer. The ethylene-based polymer is formed from reacting (under polymerization conditions) ethylene monomer and bisallyl maleate. The ethylene-based polymer is the polymerization reaction product of ethylene and bisallyl maleate. It is understood that the bisallyl maleate can be (i) cis-bisallyl maleate isomer, (ii) trans-bisallyl maleate isomer, or (iii) a mixture of isomers cis-bisallyl maleate isomer and trans-bisallyl maleate isomer (individually and collectively hereafter referred to as "BAIIM"). The isomer cis-bisallyl maleate (or "BAIIM") has the Structure I:

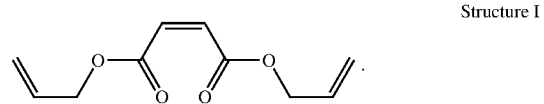

Structure I

Bounded by no particular theory, BAIIM is a branching agent and increases the melt strength of the formant ethylene-based polymer. Under polymerization conditions, one, two, or all three carbon-carbon double bonds in Structure I react with (bond with) the growing chain of forming ethylene-based polymer, to become part of the polyethylene chain. The present ethylene-based polymer with ethylene monomer and bisallyl maleate branching agent is interchangeably referred to as "BAIIM-PE."

In an embodiment, the BAIIM is a mixture of isomers containing cis-bisallyl maleate isomer and trans-bisallyl maleate isomer. In a further embodiment, the BAIIM is a mixture of isomers containing a majority amount (greater than 50 wt %) of the cis-bisallyl maleate isomer and a minority amount of trans-bisallyl maleate isomer, weight percent based on the total weight of the BAIIM mixture of isomers.

In an embodiment, the BAIIM-PE includes, in polymerized form, from 95 wt %, or 96 wt %, or 97 wt %, or 98 wt % to 99 wt %, or 99.5 wt %, or 99.8 wt %, or 99.9 wt %, or 99.95 wt %, or 99.99 wt % of ethylene, and a reciprocal amount of BAIIM, or from 5.0 wt %, or 4.0 wt %, or 3.0 wt %, or 2.0 wt % to 1.0 wt %, or 0.5 wt %, or 0.2 wt %, or 0.1 wt %, or 0.05 wt %, or 0.01 wt % of BAIIM. Weight percent is based on total weight of the BAIIM-PE. In a further embodiment, the BAIIM-PE includes, in polymerized form, from 95 wt % to 99.99 wt %, or from 96 wt % to 99.95 wt %, or from 97 wt % to 99.9 wt %, or from 98 wt % to 99.8 wt % of ethylene, and the BAIIM is present in an amount from 5.0 wt % to 0.01 wt %, or from 4.0 wt % to 0.05 wt %, or from 3.0 wt % to 0.1 wt %, or from 2.0 wt % to 0.2 wt %.

Figure 1:
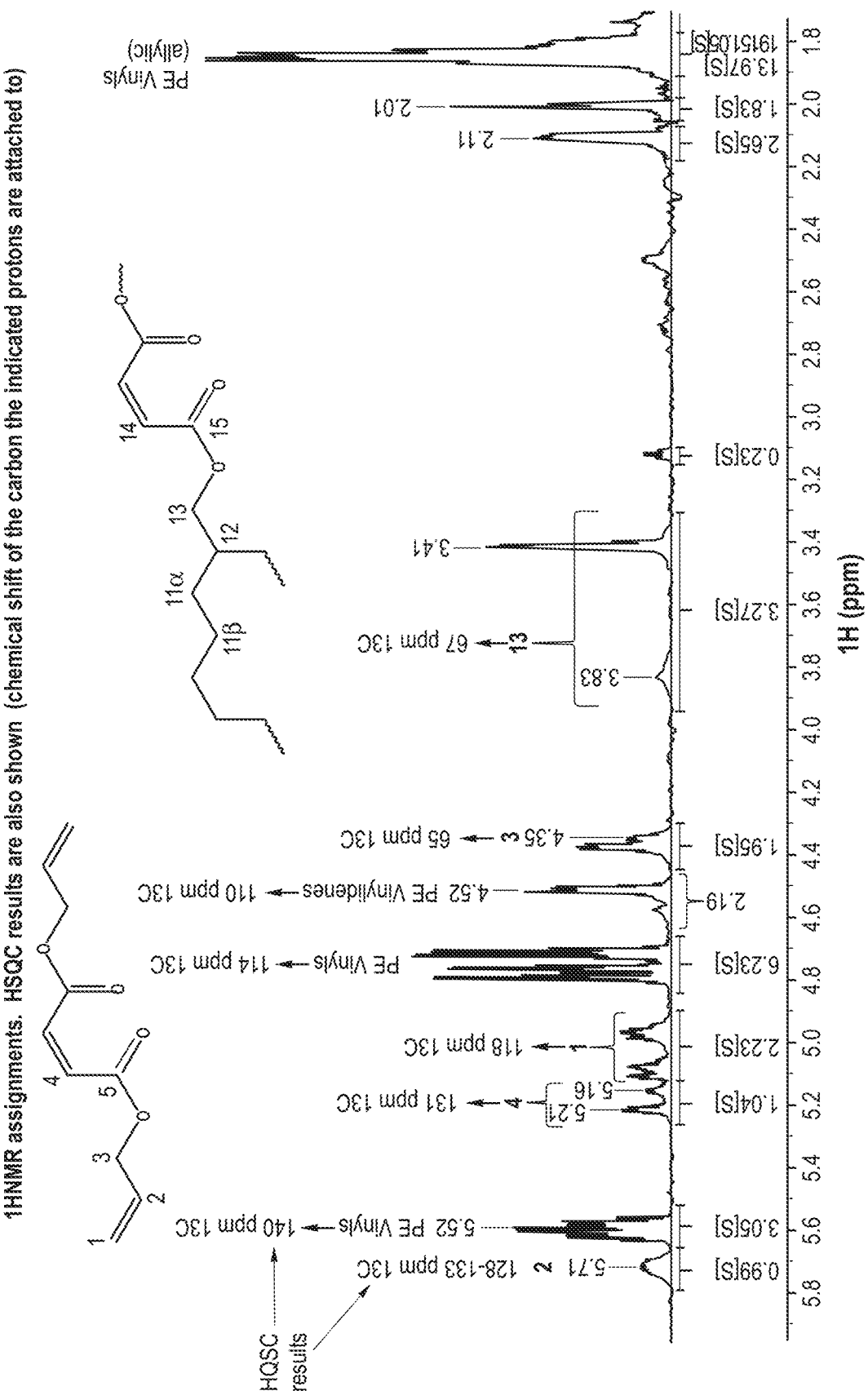
FIG. 1 is a $^1$H NMR spectrum of an ethylene-based polymer formed by reacting ethylene monomer and bisallyl maleate ("BAIIM-PE") in accordance with an embodiment of the present disclosure.
Figure 2:
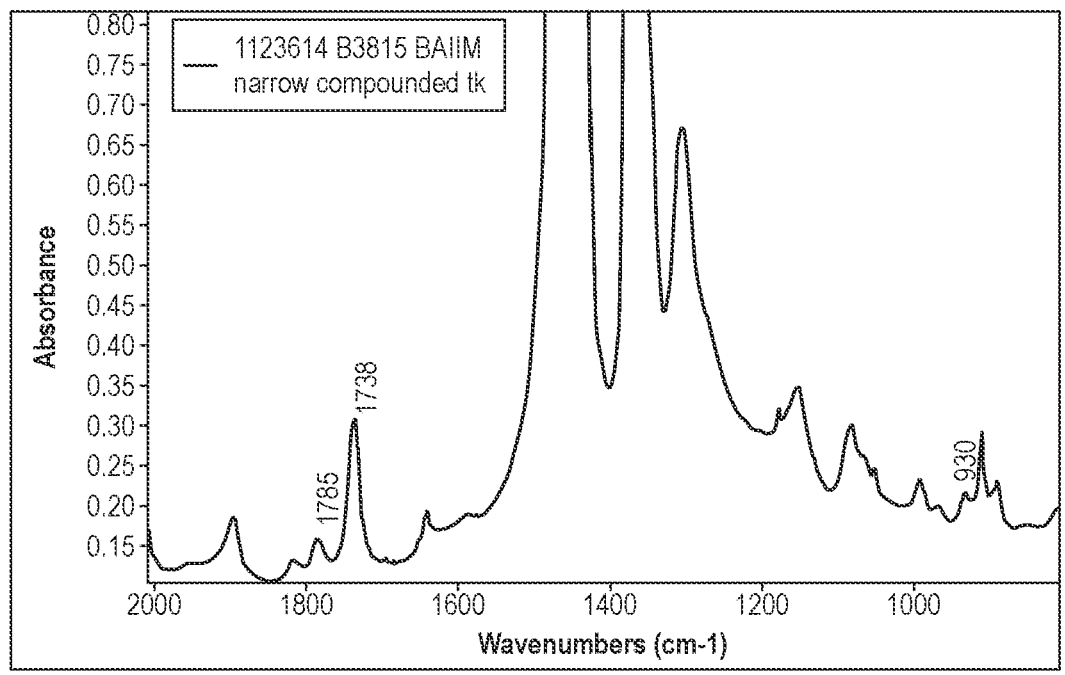
FIG. 2 shows two IR spectra of the same BAIIM-PE from which the $^1$H NMR spectrum of FIG. 1 was acquired.
Figure 2:
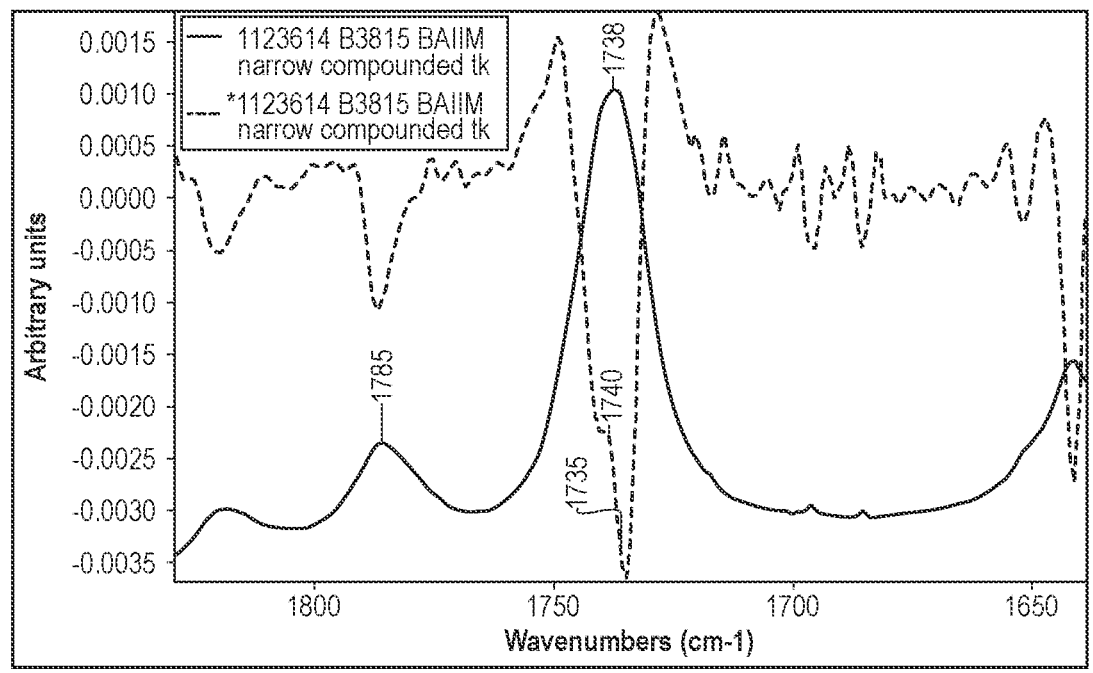
Figure 3:
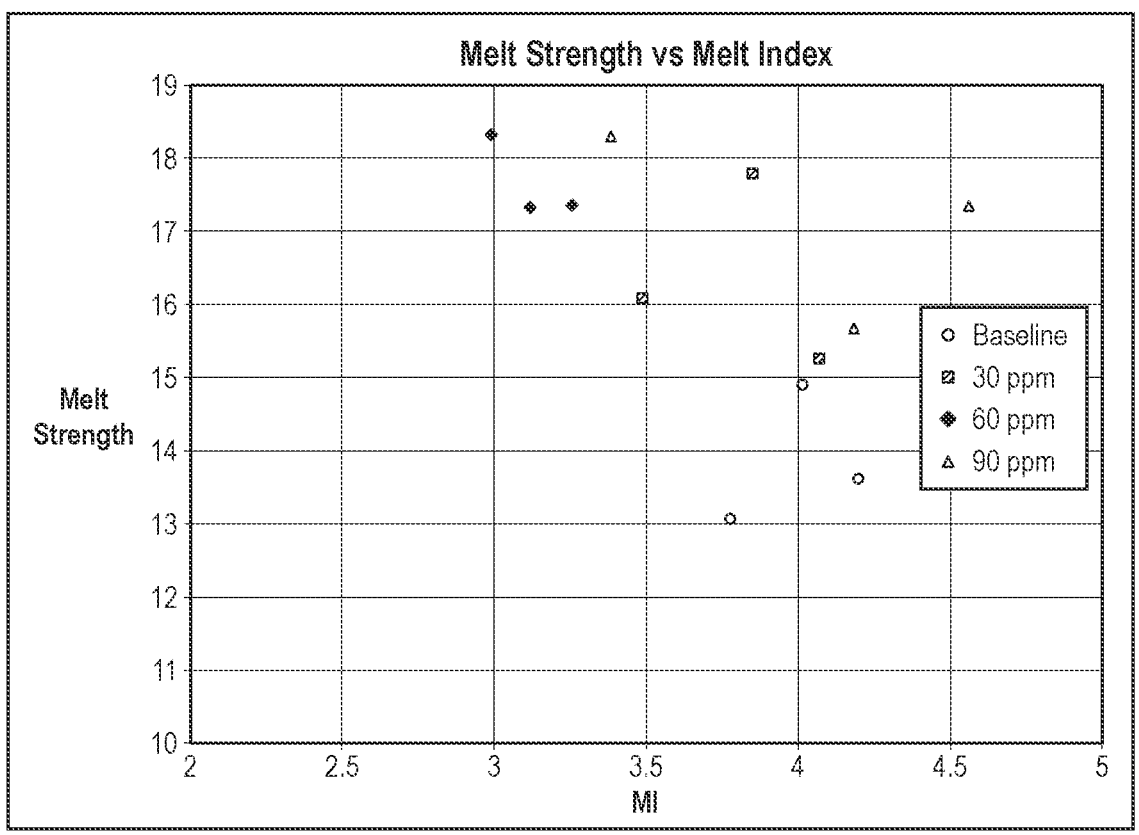
FIG. 3 is a graph showing melt strength vs. melt index for several BAIIM-PE having, varying amounts of bisallyl maleate in accordance with embodiments of the present disclosure.

In an embodiment, the BAIIM-PE has $^1$H NMR peaks at about 3.41 ppm and at about 3.8 ppm. In a further embodiment, the BAIIM-PE has $^1$H NMR peaks at about 3.41 ppm and about 3.8 ppm and no peaks are present between the 3.41 ppm peak and 3.8 ppm peak. Bounded by no particular theory, the peaks at about 3.41 ppm and at about 3.8 ppm are believed to be due to the allylic CH2—O—of the BAIIM after it has incorporated into the present ethylene-based polymer, thus it is an R, R'—CH2—O—. The peaks at about 3.41 ppm and at about 3.8 ppm indicate incorporation of BAIIM into the polyethylene chain and lead to an increase in melt strength for the BAIIM-PE. A $^1$H NMR spectrum of the present BAIIM-PE is shown at FIG. 1.

In an embodiment, the $^1$H NMR peak at about 3.41 ppm has an area at least three times greater than the area of the $^1$H NMR peak at about 3.8 ppm for the BAIIM-PE. In an further embodiment, the $^1$H NMR peak at about 3.41 ppm has an area from 3 times, or 4 times to 6 times, or 7 times greater than the area of the 1H NMR peak at about 3.8 ppm.

In an embodiment, the BAIIM-PE exhibits two carbonyl peaks, a first carbonyl peak centered around 1737 cm−1 and a second carbonyl peak centered around 1785 cm−1, in the infrared spectrum. Bounded by no particular theory, it is believed the peak at 1737 cm−1 is due to the presence of a saturated ester functional group and the peak at 1785 cm−1 is due to the presence of carbonyl stretching vibration in a lactone.

In an embodiment, the BAIIM-PE has a density from 0.916 g/cc to 0.930 g/cc.

In an embodiment, the BAIIM-PE has a melt index ($I_2$) from 0.15 g/10 min, or 0.5 g/10 min, or 1.0 g/10 min, or 5.0 g/10 min, or 10 g/10 min, or 20 g/10 min, or 30 g/10 min, or 40 g/10 min to 50 g/10 min, or 60 g/10 min, or 70 g/10 min, or 80 g/10 min. In a further embodiment, the BAIIM-PE has a melt index ($I_2$) from 0.15 g/10 min to 80 g/10 min, or from 0.5 g/10 min to 70 g/10 min, or from 1.0 g/10 min to 60 g/10 min, or from 5.0 g/10 min to 50 g/10 min, or from 10 g/10 min to 40 g/10 min, or from 20 g/10 min to 30 g/10 min.

In an embodiment, the BAIIM-PE contains from 0.021 wt % to 0.063 wt % BAIIM (based on the total weight of the BAIIM-PE), has $^1$H NMR peaks at about 3.41 ppm and about 3.8 ppm, has IR peaks at 1737 cm−1 and at 1785 cm−1, and the BAIIM-PE has a melt index from 0.15 g/10 min to 80 g/10 min.

The BAIIM-PE may include a combination of two or more embodiments as described herein.

The present disclosure also provides an article comprising at least one component formed from the BAIIM-PE, described herein.

In an embodiment, the article is a coating of a film.

In an embodiment, the article is a coating.

In an embodiment, the article is a film.

The article may include a combination of two or more embodiments as described herein.

2. Process

The present disclosure also provides a process for producing the present ethylene-based polymer composition. The process includes polymerizing ethylene monomer in the presence of bisallyl maleate under polymerization conditions and forming an ethylene-based polymer (interchangeably referred to as "BAIIM-PE"). The term "polymerization conditions," as used herein, includes free-radical initiated polymerization under high pressure (from 11,000 psig to 53,000 psig) and high temperature (from 200° C. to 350° C.), in a polymerization reactor.

Polymerization conditions include polymerization utilizing one, two, or more free-radical indicators. Nonlimiting examples of suitable free-radical initiators include organic peroxides, cyclic peroxides, diacyl peroxides, dialkyl peroxides, hydroperoxides, peroxycarbonates, peroxydicarbonates, peroxyesters, peroxyketals, t-butyl peroxy pivalate, di-t-butyl peroxide, t-butyl peroxy acetate, t-butyl peroxy ethylhexanoate, and t-butyl peroxy-2-hexanoate, and combinations thereof. In an embodiment, these organic peroxy initiators are used in an amount from 0.001 wt % to 0.2 wt %, based upon the weight of polymerizable monomers.

In a further embodiment, the free-radical initiator includes at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators.

For the polymerization conditions, the polymerization reactor includes a reactor configuration including a tubular reactor, and/or an autoclave reactor, and/or a continuously stirred tank reactor.

In an embodiment, the polymerization takes place in a reactor configuration that includes at least one tubular reactor.

In an embodiment, the polymerization takes place in a reactor configuration that includes at least one autoclave reactor.

In an embodiment, the process includes reacting ethylene with from 30 mol ppm (0.021 wt %) to 90 mol ppm (0.063 wt %) bisallyl maleate based on the amount of added ethylene to the reactor; and forming an ethylene-based polymer having a melt strength from greater than 15 cN to 20 cN. As used herein, the term "mol ppm" is the relationship of one mole of ethylene for $1 \times 10^{-6}$ moles of BAIIM.

In an embodiment, a conventional chain transfer agent (CTA) is used to control molecular weight. One or more CTAs are added during the polymerization process. Nonlimiting examples of CTAs include propylene, isobutane, n-butane, 1-butene, methyl ethyl ketone, acetone, ethyl acetate, propionaldehyde, ISOPAR (ExxonMobil Chemical Co.), methanol, and isopropanol. In an embodiment, the amount of CTA used in the process is from 0.03 weight percent to 10 weight percent of the total reaction mixture.

In an embodiment, the process includes a process recycle loop to improve conversion efficiency.

In an embodiment, the polymerization takes place in a tubular reactor. The tubular reactor can be a single zone tubular reactor or a multi zone tubular reactor. In a further embodiment, the tubular reaction is a multi zone tubular reactor. A multi zone tubular reactor includes alternate locations of feeding fresh ethylene to control the ethylene to CTA ratio and therefore control polymer properties. Fresh ethylene monomer is simultaneously added in multiple locations to achieve the desired ethylene monomer to chain transfer ratio. In a similar way, addition of fresh CTA addition points are selected to control polymer properties. Fresh CTA is simultaneously added in multiple locations to achieve the desired CTA to ethylene monomer ratio. Likewise, the addition points and the amount of fresh BAIIM are controlled to control gel formation while maximizing the desired property of increased melt strength and performance in targeted applications. Fresh BAIIM is simultaneously added in multiple locations to achieve the desired branching agent to ethylene monomer ratio. The use of a BAIIM to broaden molecular weight distribution and to increase the melt strength of the polymer will put further requirements on the distribution of the CTA and the BAIIM along a reactor system in order to achieve the desired change in product properties without or minimizing potential negative impacts such as gel formation, reactor fouling, process instabilities, and minimizing the amount of BAIIM. Nonlimiting examples of suitable multi zone tubular reactors are described in WO2013059042 and WO2013078018, the content of each reference incorporated by reference herein.

In an embodiment, the polymerization takes place in a multi reactor system, where an autoclave reactor precedes the tubular reactor. The addition points and amounts of fresh ethylene, fresh CTA, and fresh BAIIM are controlled to achieve the desired ratios of CTA to ethylene monomer and BAIIM to ethylene monomer in the feeds to and or in the reaction zones.

In an embodiment, the bisallyl maleate is fed through a compression stage directly into the reaction zone or directly into the feed to the reaction zone. The choice of feed point into the reaction and/or a reaction zone depends on several factors, including, but not limited to, the solubility of the BAIIM in pressurized ethylene and/or solvent, the condensation of the BAIIM in pressurized ethylene, and/or fouling by premature polymerization of the BAIIM in the pre-heater used to heat the reactor contents prior to injection of initiator.

In an embodiment, the bisallyl maleate is fed directly into the reaction zone or directly into the feed to the reaction zone.

In an embodiment, the BAIIM is fed only to reaction zone 1.

In an embodiment, the ethylene fed to the first reaction zone is from 10 percent to 100 percent of the total ethylene fed to the polymerization. In a further embodiment, the ethylene fed to the first reaction zone is from 20 percent to 80 percent, further from 25 percent to 75 percent, further from 30 percent to 70 percent, further from 40 percent to 60 percent, of the total ethylene fed to the polymerization.

In an embodiment, the process takes place in a reactor configuration that comprises at least one tubular reactor. In a further embodiment, the maximum temperature in each reaction zone is from 200° C. to 350° C., further from 220° C. to 325° C., further from 225° C. to 300° C.

In an embodiment, the polymerization pressure at the first inlet of the reactor is from 800 bar to 3600 bar, further from 1500 bar to 3400 bar, further from 2000 bar to 3200 bar.

In an embodiment, the ratio of "the concentration of the CTA in the feed to reaction zone i" to "the concentration of the CTA in the feed added to reaction zone 1" is greater than, or equal to, 1.

In an embodiment, the ratio of "the concentration of the CTA in the feed to reaction zone i" to "the concentration of the CTA in the feed added to reaction zone 1" is less than 1, further less than 0.8, further less than 0.6, further less than 0.4.

In an embodiment the number of reaction zones range from 3 to 6.

Non-limiting examples of ethylene monomer used for the production of the ethylene-based polymer include purified ethylene, which is obtained by removing polar components from a loop recycle stream, or by using a reaction system configuration, such that only fresh ethylene is used for making the inventive ethylene-based polymer. Further examples of ethylene monomer include ethylene monomer from a recycle loop.

In an embodiment, the ethylene-based polymer composition includes ethylene monomer the BAIIM, and one or more comonomers. Non-limiting examples of comonomers include α-olefins, acrylates, methacrylates and anhydrides, each having no more than 20 carbon atoms. The α-olefin comonomers may have from 3 to 10 carbon atoms, or in the alternative, the α-olefin comonomers may have from 3 to 8 carbon atoms or 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

Additives

In an embodiment, a composition is provided. The composition includes the BAIIM-PE and also optionally includes one or more additives. Non-limiting examples of additives include stabilizers, plasticizers, antistatic agents, pigments, dyes, nucleating agents, fillers, slip agents, fire retardants, processing aids, smoke inhibitors, viscosity control agents and anti-blocking agents. The composition may, for example, include less than 10 percent of the combined weight of one or more additives, based on the weight of the composition. The composition with BAIIM-PE and one or more optional additives is hereafter interchangeably referred to as "ethylene-based polymer composition."

In an embodiment the ethylene-based polymer composition is treated with one or more stabilizers, for example, antioxidants, such as IRGANOX 1010, IRGANOX 1076 and IRGAFOS 168.

Applications

The ethylene-based polymer composition of the present disclosure may be employed in a variety of conventional thermoplastic fabrication processes to produce useful articles, including monolayer and multilayer films; molded articles, such as blow molded, injection molded, or roto-molded articles; coatings; fibers; and woven or non-woven fabrics.

The present ethylene-based polymer composition may be used in a variety of films, including but not limited to, clarity shrink films, collation shrink films, cast stretch films, silage films, stretch hood, sealants, and diaper backsheets. Other suitable applications include, but are not limited to, wires and cables, gaskets and profiles, adhesives, footwear components, and auto interior parts.

Applicant discovered that addition of bisallyl maleate during polymerization of ethylene leads to increased melt strength of the LDPE resin for the same MI when compared to the LDPE resin made under the same polymerization conditions and without addition of bisallyl maleate.

By way of example, and not limitation, some embodiments of the present disclosure will now be described in detail in the following examples.

Examples

Materials used in the examples are set forth in Table 1 below.

TABLE 1

| Commercial name | Description | Source |
| --- | --- | --- |
| Bisallyl maleate | branching agent | Sigma-Aldrich |
| Isopar E | solvent | Exxon Mobil |
| TPA | tert-butyl peroxy acetate - initiator | Akzo-Nobel |
| TPO | tert-butyl peroxy ethylhexanoate - initiator | Akzo Nobel |
| Propylene | chain transfer agent | Dow Inc. |

The polymerization was carried out in a continuously stirred tank reactor. Four electric heater bands were used to heat and/or cool the reactor to 220° C. The reactor pressure was about 800 bar. Propylene was used as a chain transfer agent (CTA). Ethylene and propylene were fed to the top of the reactor by the agitator shaft. TPO and TPA diluted in Isopar E were injected into one side of the reactor to initiate the reaction. Bisallyl maleate, also diluted in Isopar E, was fed into a separate injector on the side of the reactor. The reactor residence time was about 1.5 minutes. A single outlet on the bottom reactor contained all unreacted reactants and polymer. Polymer ("BAIM-PE") was separated from the remaining reactants by atomization, depressurizing the stream to about 1 bar and simultaneously cooling the stream to ambient temperatures. Polymer ("BAIM-PE") was then collected in powder form.

Polymerization conditions for Comparative Sample (CS) and Inventive Examples (IE) IE1, IE2, and IE3 are provided at Table 2 below.

TABLE 2

| Polymerization Conditions | | | | | |
|---|---|---|---|---|---|
| | | CS Propylene Baseline at 220° C. | IE1 30 ppm BAIIM | IE2 60 ppm BAIIM | IE3 90 ppm BAIIM |
| 2. REACTOR FEEDS/ COMPRESSOR DATA | | | | | |
| C2 Feed Flow | lbs/hr | 11.96 | 11.95 | 12.31 | 12.04 |
| 3. REACTION | | | | | |
| Reactor Pressure | psig | 24860 | 25196 | 25520 | 25477 |
| Reactor Average Temp | ° C. | 220 | 222 | 225 | 220 |
| Ethylene Conversion | wt % | 11.79 | 12.50 | 11.92 | 12.57 |
| 4. HIGH PRESSURE FEEDS | | | | | |
| BAIIM Reactor Concentration | mol ppm | 0.00 | 33.63 | 58.65 | 92.83 |
| Solvent | | Isopar E | Isopar E | Isopar E | Isopar E |
| Initiator 1 | | TPA | TPA | TPA | TPA |
| Amt of initiator 1 | mol ppm | 14.65 | 12.09 | 9.96 | 12.13 |
| Initiator 2 | | TPO | TPO | TPO | TPO |
| Amt of Initiator 2 | mol ppm | 14.65 | 12.29 | 9.9.6 | 12.13 |
| 5. LOW PRESSURE FEEDS | | | | | |
| CTA | | Propylene | Propylene | Propylene | Propylene |
| CTA Reactor Concentration | mol ppm | 15563 | 22209 | 22489 | 22250 |
| BAIIM-PE polymer data | | | | | |
| Weight (lbs) | | 7.92 | 12.11 | 71.39 | 11.54 |
| I2 | | 4.00 | 3.67 | 4.00 | 3.99 |
| I10/I2 | | 10.79 | 12.36 | 12.25 | 12.41 |
| Melt strength | | 13.84 | 16.36 | 17.63 | 17.09 |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An ethylene-based polymer consisting of:
  (i) polymerized units of ethylene,
  (ii) polymerized units of an isomer of bisallyl maleate,
  (iii) optional polymerized units of a comonomer selected from the group consisting of α-olefin, acrylate, and methacrylate, wherein the ethylene-based polymer is a random or block copolymer.

2. The ethylene-based polymer of claim 1 having $^1$H NMR peaks at about 3.41 ppm and about 3.8 ppm.

3. The ethylene-based polymer of claim 2 wherein the $^1$H NMR peak at about 3.41 ppm has an area at least four times greater than the area of the $^1$H NMR peak at 3.8 ppm.

4. The ethylene-based polymer of claim 3 wherein no $^1$H NMR peak is present between the $^1$H NMR peak at 3.41 ppm and the $^1$H NMR peak at 3.8 ppm.

5. The ethylene-based polymer of claim 4 having a first IR peak centered around 1737 cm-1 and a second IR peak centered around 1785 cm-1.

6. The ethylene-based polymer of claim 5 wherein the first IR peak at 1738 cm-1 comprises a first carbonyl peak centered at 1735 cm-1 and a second carbonyl peak centered at 1740 cm-1.

7. The ethylene-based polymer of claim 6 having a melt index from 0.15 g/10 min to 80.0 g/10 min.

8. The ethylene-based polymer of claim 7 consisting of from 0.02 wt % to 5.0 wt % isomer of bisallyl maleate, the ethylene-based polymer having a melt strength from greater than 15 cN to 20 cN.

9. A process comprising:
  reacting components consisting of
  (i) ethylene,
  (ii) an isomer of bisallyl maleate,
  (iii) an optional comonomer selected from the group consisting of α-olefin, acrylate, and methacrylate, and
  forming a random or block ethylene-based polymer copolymer consisting of
  (i) polymerized units of ethylene,
  (ii) polymerized units of an isomer of bisallyl maleate,
  (iii) optional polymerized units of a comonomer selected from the group consisting of α-olefin, acrylate, and methacrylate, and
  the ethylene-based copolymer having $^1$H NMR peaks at about 3.41 ppm and about 3.8 ppm.

10. The process of claim 9 comprising reacting components consisting of ethylene and an isomer of bisallyl maleate in a tubular reactor; and
  forming a random or block ethylene-based copolymer.

11. The process of claim 9 comprising reacting components consisting of ethylene and an isomer of bisallyl maleate in an autoclave reactor; and
  forming a random or block ethylene-based copolymer.

12. The process of claim 9 comprising
  reacting components consisting of (i) ethylene and (ii) from 30 ppm to 90 ppm of an isomer of bisallyl maleate; and
  forming a random or block ethylene-based copolymer having a melt strength from greater than 15 cN to 20 cN.

13. The ethylene-based polymer of claim 8 wherein the isomer of bisallyl maleate is selected from the group consisting of (i) cis-bisallyl maleate isomer, (ii) trans-bisallyl maleate isomer, and (iii) a mixture of isomers cis-bisallyl maleate isomer and trans-bisallyl maleate isomer.

14. The ethylene-based polymer of claim 13 wherein the isomer of bisallyl maleate is cis-bisallyl maleate having the Structure I:

Structure I

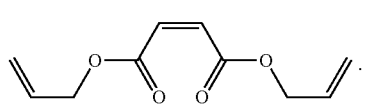

15. The ethylene-based polymer of claim 13 consisting of (i) polymerized units of ethylene and (ii) polymerized units of isomer of bisallyl maleate.

16. The ethylene-based polymer of claim 1 wherein (i) the polymerized units of ethylene and (ii) the polymerized units of isomer of bisallyl maleate are incorporated into the polymer chain of the ethylene-based polymer.

17. An ethylene-based copolymer composition comprising:
- (A) a random or block ethylene-based copolymer consisting of
  - (i) polymerized units of ethylene,
  - (ii) from 0.021 wt % to 0.063 wt % of polymerized units of an isomer of bisallyl maleate,
  - (iii) optional polymerized units of a comonomer selected from the group consisting of α-olefin, acrylate, and methacrylate, and
- (B) an optional additive; and the ethylene-based copolymer has
- (v) $^1$H NMR peaks at about 3.41 ppm and about 3.8 ppm,
- (vi) IR peaks at 1737 cm-1 and at 1785 cm-1, and
- (vii) a melt index from 0.15 g/10 min to 80 g/10 min.

18. The ethylene-based copolymer composition of claim 17 wherein the additive is present and is selected from the group consisting of stabilizer, plasticizer, antistatic agent, pigment, dye, nucleating agent, fillers, slip agent, fire retardant, processing aid, smoke inhibitor, viscosity control agents, anti-blocking agent, and combinations thereof.

19. The ethylene-based copolymer composition of claim 17 wherein the additive is a stabilizer that is an antioxidant.

* * * * *